(12) United States Patent
Jin et al.

(10) Patent No.: US 10,353,787 B2
(45) Date of Patent: Jul. 16, 2019

(54) DATA STRIPPING, ALLOCATION AND RECONSTRUCTION

(71) Applicant: AGENCY FOR SCIENCE, TECHNOLOGY AND RESEARCH, Singapore (SG)

(72) Inventors: Chao Jin, Singapore (SG); Shibin Chen, Singapore (SG); Weiya Xi, Singapore (SG); Khai Leong Yong, Singapore (SG); Quanqing Xu, Singapore (SG)

(73) Assignee: AGENCY FOR SCIENCE, TECHNOLOGY AND SCIENCE, Singapore (SG)

( * ) Notice: Subject to any disclaimer, the term of this patent is extended or adjusted under 35 U.S.C. 154(b) by 132 days.

(21) Appl. No.: 15/553,976

(22) PCT Filed: Feb. 26, 2016

(86) PCT No.: PCT/SG2016/050095
§ 371 (c)(1),
(2) Date: Aug. 25, 2017

(87) PCT Pub. No.: WO2016/137402
PCT Pub. Date: Sep. 1, 2016

(65) Prior Publication Data
US 2018/0246793 A1    Aug. 30, 2018

(30) Foreign Application Priority Data
Feb. 26, 2015    (SG) .............................. 10201501440T

(51) Int. Cl.
*G06F 11/00* (2006.01)
*G06F 11/20* (2006.01)
(Continued)

(52) U.S. Cl.
CPC ............ *G06F 11/2094* (2013.01); *G06F 3/06* (2013.01); *G06F 11/1076* (2013.01);
(Continued)

(58) Field of Classification Search
CPC ............ G06F 11/2017; G06F 11/2056; G06F 11/2071; G06F 11/2074; G06F 11/2076;
(Continued)

(56) References Cited

U.S. PATENT DOCUMENTS 5,630,007 A    5/1997 Kobayashi et al.
2002/0156973 A1    10/2002 Ulrich et al.
(Continued)

OTHER PUBLICATIONS

PCT Notification of Transmittal of The International Search Report and The Written Opinion of the International Searching Authority, or The Declaration for PCT Counterpart Application No. PCT/SG2016/050095 Containing International Search Report, 16 pgs. (dated Apr. 13, 2016).

*Primary Examiner* — Sarai E Butler
(74) *Attorney, Agent, or Firm* — Womble Bond Dickinson (US) LLP

(57) ABSTRACT

A method for data stripping, allocation and reconstruction in an active drive storage system including a plurality of active object storage devices, each of the plurality of active object storage devices including one or more storage devices and a controller is provided. The method includes the controller of the identified one of the plurality of active object storage devices segmenting the received data into a plurality of data chunks and generating one or more parity chunks in response to the plurality of data chunks. The method further includes the controller of the identified one of the plurality of active object storage devices reorganizing the plurality of data chunks and the one or more parity chunks in response to a number of the plurality of data chunks and a number of the one or more of the plurality of active object storage
(Continued)

devices into which the received data is to be stored. Finally, the method includes the step of the controller of the identified one of the plurality of active object storage devices storing the plurality of data chunks and the one or more parity chunks into the one or more of the plurality of active object storage devices.

17 Claims, 13 Drawing Sheets

(51) Int. Cl.
*G06F 3/06* (2006.01)
*G06F 11/10* (2006.01)
*G06F 16/00* (2019.01)

(52) U.S. Cl.
CPC .......... *G06F 11/1088* (2013.01); *G06F 16/00* (2019.01); *G06F 2201/82* (2013.01); *G06F 2211/104* (2013.01)

(58) Field of Classification Search
CPC ............. G06F 11/2079; G06F 11/2087; G06F 11/2089; G06F 11/2092
USPC .................................................. 714/6.21, 6.2
See application file for complete search history.

(56) References Cited

U.S. PATENT DOCUMENTS

| | | |
|---|---|---|
| 2013/0067294 A1 | 3/2013 | Flynn et al. |
| 2017/0017401 A1* | 1/2017 | Grube ................. H04L 67/1097 |
| 2017/0315869 A1* | 11/2017 | Rungta ................. G06F 3/0619 |
| 2017/0371543 A1* | 12/2017 | Wideman ................ G06F 3/061 |

* cited by examiner

DATA STRIPPING, ALLOCATION AND RECONSTRUCTION

CROSS-REFERENCE TO RELATED APPLICATIONS

This patent application is a U.S. National Phase application under 35 U.S.C. § 371 of International Application No. PCT/SG2015/050095, filed on Feb. 26, 2016, entitled DATA STRIPPING, ALLOCATION AND RECONSTRUCTION, which claims priority from Singapore Patent Application No. 10201501440T, filed on Feb. 26, 2015.

TECHNICAL FIELD

The present invention generally relates to methods and apparatus for data storage in a storage system with an array of active storage devices, and more particularly relates to methods and apparatus for data stripping, parity computation, data allocation and reconstruction within a storage system with an array of active storage devices.

BACKGROUND OF THE DISCLOSURE

A storage system with an array of active storage devices contains both hard disk drives (HDDs) and active storage units. Ideally, data reconstruction of data in a failed data storage device in a data storage system occurs as offline reconstruction in which the storage system stops replying to any client/application server in order to allow the data reconstruction process to run at full speed. However, this scenario is not practical in most production environments as most storage systems are required to provide uninterrupted data services even when they are recovering from disk failures.

An erasure code protects data when there is a device failure in a system. Using an erasure code to improve system reliability is more economical than using data replications. The erasure code implemented can protect failure from both HDDs and active storage units including active controller boards (ACBs) and HDDs. On the other hand, replication requires a much higher amount of redundant data, as large as or multiple times larger than the original data. However, replication has a much shorter recovery equation, meaning that it has higher recovery efficiency upon disk failures.

Thus, what is needed is a method and device for data stripping, parity computation, data allocation and data reconstruction within a storage system with an array of active storage devices which at least partially overcomes the drawbacks of present approaches and provides improved data access performance and shortened failure reconstruction time. Furthermore, other desirable features and characteristics will become apparent from the subsequent detailed description and the appended claims, taken in conjunction with the accompanying drawings and this background of the disclosure.

SUMMARY

According to at least one embodiment of the present invention a method for data stripping, allocation and reconstruction in an active drive storage system including a plurality of active object storage devices, each of the plurality of active object storage devices including one or more storage devices and a controller is provided. The method includes the steps the controller of the identified one of the plurality of active object storage devices segmenting the received data into a plurality of data chunks and generating one or more parity chunks in response to the plurality of data chunks. The method further includes the step of the controller of the identified one of the plurality of active object storage devices reorganizing the plurality of data chunks and the one or more parity chunks in response to a number of the plurality of data chunks and a number of the one or more of the plurality of active object storage devices into which the received data is to be stored. Finally, the method includes the step of the controller of the identified one of the plurality of active object storage devices storing the plurality of data chunks and the one or more parity chunks into the one or more of the plurality of active object storage devices.

In accordance with another aspect of at least one embodiment of the present invention, a method for data stripping, allocation and reconstruction in an active drive storage system including a plurality of active object storage devices coupled to one or more application servers is provided. The method includes the steps of receiving data for storage in one or more of the plurality of active object storage devices and, at one of the one or more application servers, segmenting the received data into a plurality of data chunks. The method also includes the steps of the one of the one or more application servers generating one or more parity chunks in response to the plurality of data chunks and reorganizing the plurality of data chunks and the one or more parity chunks in response to a number of the plurality of data chunks and a number of the one or more of the plurality of active object storage devices into which the received data is to be stored. Finally, the method includes the one of the one or more application servers storing the plurality of data chunks and the one or more parity chunks into the one or more of the plurality of active object storage devices.

In accordance with a further aspect of at least one embodiment of the present invention, a method for failure recovery from failure of an active object storage device in an active drive storage system including a plurality of active object storage devices, each of the plurality of active object storage devices belonging to one of a plurality of groups and each of the plurality of active object storage devices including one or more storage devices and a controller is provided. The method includes the steps of selecting a recovery list constructor for each one of the plurality of groups that a failed active object storage device has participated in and each recovery list constructor constructing a need-to-be-constructed data list for its group. The method also includes the steps of each recovery list constructor sending the need-to-be-constructed data list for its group to a replacement active object storage device assigned as a recovery master for the group and each recovery master scheduling the reconstruction for the group which includes one or more of sending requests to access data and corresponding parity data, computing recovered data in response to the accessed data and corresponding parity data, and writing the recovered data to the recovery master. Then, the method includes the step of the recovery master acting as the replacement active object storage device.

BRIEF DESCRIPTION OF THE DRAWINGS

The accompanying figures, where like reference numerals refer to identical or functionally similar elements throughout the separate views and which together with the detailed description below are incorporated in and form part of the specification, serve to illustrate various embodiments and to explain various principles and advantages in accordance with a present embodiment.

Skilled artisans will appreciate that elements in the figures are illustrated for simplicity and clarity and have not necessarily been depicted to scale. For example, the illustrations of FIGS. 2, 3, 4, 6, 7 and 13 are representations of the relationship and structure of various elements of an active storage array in accordance with the present embodiment.

DETAILED DESCRIPTION

The following detailed description is merely exemplary in nature and is not intended to limit the invention or the application and uses of the invention. Furthermore, there is no intention to be bound by any theory presented in the preceding background of the invention or the following detailed description. It is the intent of the present embodiment to present architectures and processes for data stripping, parity computation, data allocation and reconstruction of a storage system with an array of active storage devices. Data read and write and update procedures, read failure and node/device failure reconstruction processes are also presented which allow data access performance to be greatly improved and read failure reconstruction time to be shortened through high parallelism of the method and systems presented. Thus, in accordance with the present embodiment processes for data stripping, parity computation, grouping and allocation; processes to read and write and update data; processes to reconstruct data when a read failure is encountered; and processes to reconstruct a node after a system failure are presented.

Figure 1:
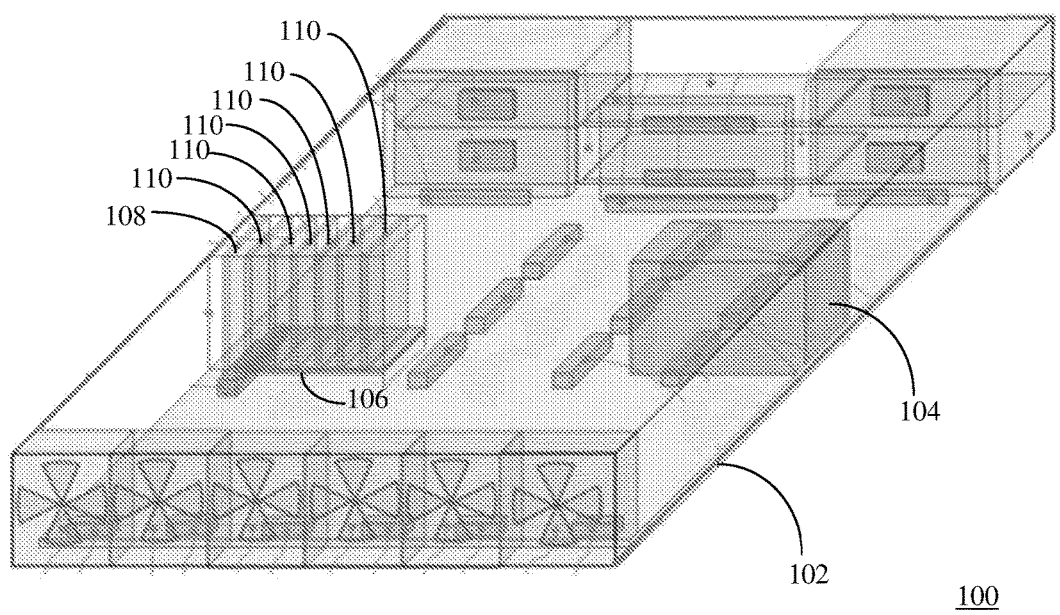
FIG. 1 illustrates a front right top perspective view of a chassis housing for an active storage array in accordance with a present embodiment.

Referring to FIG. 1, a front right top perspective view 100 of a chassis housing 102 acting as a storage enclosure for an array of active storage devices in accordance with the present embodiment. A single active storage unit (ASU) 104, 106 fits into an active hybrid bay of the chassis housing 102 and consists of one active controller board (ACB) 108 and six hard disk drives (HDDs) 110. Those skilled in the art will realize that the ratio of one ACB to six HDDs is merely exemplary and other ratios of ACB to HDDs would work as well. Also, those skilled in the art will realize that while an active controller board can be a board (e.g., board 108 depicted in FIG. 1), it could also be a subsystem or other component integrated with either the chassis 102 or one or more of the HDDs 110 or separate from these devices which acts as a controller for control of the HDDs 110. There are thirty bays in the chassis housing 102. Twenty-nine of the bays are configured to receive ASUs essentially the same as ASU 106 which consists one ACB and six HDDs. These twenty-nine ASUs are for data storage. The last bay is configured to receive a special unit 104 which consists of two ACBs and two HDDs. The unit 104 is for management and/or gateway control. Again, those skilled in the art will realize that the number of bays in a chassis is a design choice and the selection of thirty bays as described herein is exemplary only. Thus, Active Storage Units (ASUs) 106 can be added subject to the space available in the chassis housing 102.

In accordance with the present embodiment, each ACB comes with a Non-Volatile Memory (NVM) such as a flash memory or a STTMRAM memory device, a System on a Chip (SoC) storage device, a DRAM memory device, or other storage components. The NVM stores metadata and often used data. Each ACB can connect to up to six HDDs into an ASU. Each of the HDDs can be one Active Object Storage Device (AOSD). Therefore, in one ASU, there are a maximum of six AOSDs, and in one chassis, there are a maximum of 174 AOSDs.

The software of the system is installed/embedded in the ACBs. The main function of the software is to manage storage, including storage in the NVMs and the HDDs, and to manage the storage cluster/distributed storage so that the whole system which could extend to more than one chassis can be self-managed and can be self-healed in accordance with the present embodiment.

Figure 2:
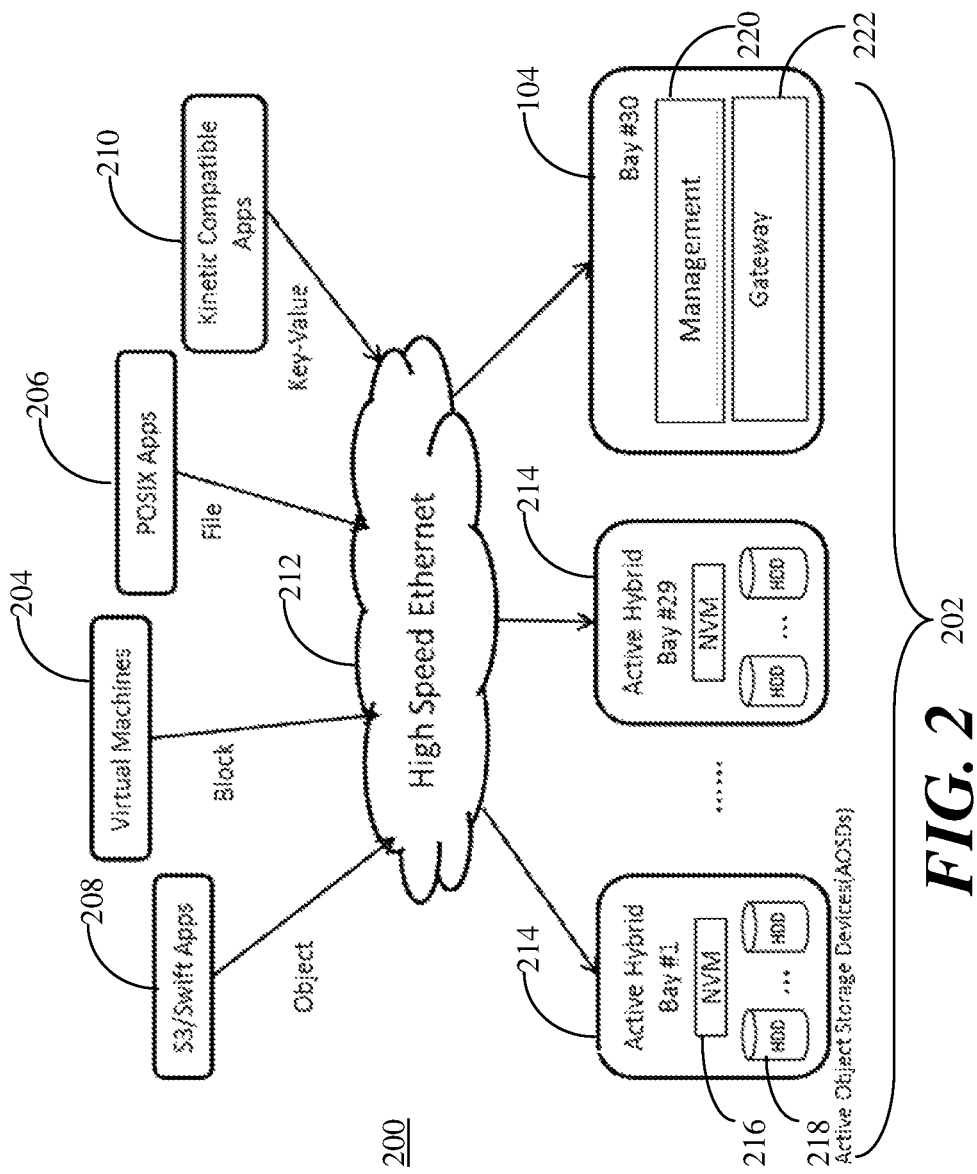
FIG. 2 illustrates a block diagram of an active storage array which provides storage service to various application servers in accordance with the present embodiment.

The chassis 102 can be mounted in a rack in a data center and connected to various application servers to provide storage services. Referring to FIG. 2, a block diagram 200 of an active storage array 202 is depicted. The active storage array 202 provides storage services to various application servers (such as a block application server 204, a file application server 206, a s3 object application server 208, or a key value application server 210) via a high speed Ethernet connection 212 in accordance with the present embodiment.

As discussed above, the maximum number of ASUs 106 in a chassis is twenty-nine, each of the ASUs 106 (referred to as an active object storage device (AOSD) 214) includes a NVM 216 and up to six HDDs 218. The thirtieth device in the chassis, as discussed above, is a special unit 104 which consists of two ACBs and two HDDs and controls management 220 and gateway 222 functions in the active storage array 202. More ASUs 106 can be added dynamically without disrupting storage services through adding more chassis when additional storage is needed, the special unit 104 controlling management 220 and gateway 222 functions of the active storage array 202 as the additional ASUs 106 are added.

Erasure codes are used to protect data when there is a device failure. The device failure can be either failure of an ACB 108 of one of the ASUs 106 or failure of an HDD. The erasure code (i.e., an INT code) is designed such that the system 202 can sustain multiple failures including ACB 108 failures and/or HDD 110 failures.

There are two different approaches to implement erasure codes in an active storage system 202. Firstly, if the ACB 108 of an ASU 106 inside a chassis performs data stripping and parity computations, the erasure code can be implemented at the ACB 108 level. In this way, data stripping and distribution is done by the active storage system 202, in particular by the ACBs 108. The other way is to implement the erasure code at the application servers 204, 206, 208, 210. When the erasure code is implemented at the application server level, the data stripping and distribution is done at the application servers 204, 206, 208, 210 which need to access the data from the active storage system 202.

Both approaches have advantages and disadvantages. The ACB erasure code implementation approach does not need any modifications or software installation at the application servers 204, 206, 208, 210. The application server erasure code implementation approach requires software installation and/or modifications at the application servers 204, 206, 208, 210 yet can support higher performance than the ACB erasure code implementation approach as the application server erasure code implementation provides higher data parallelism.

Figure 3:
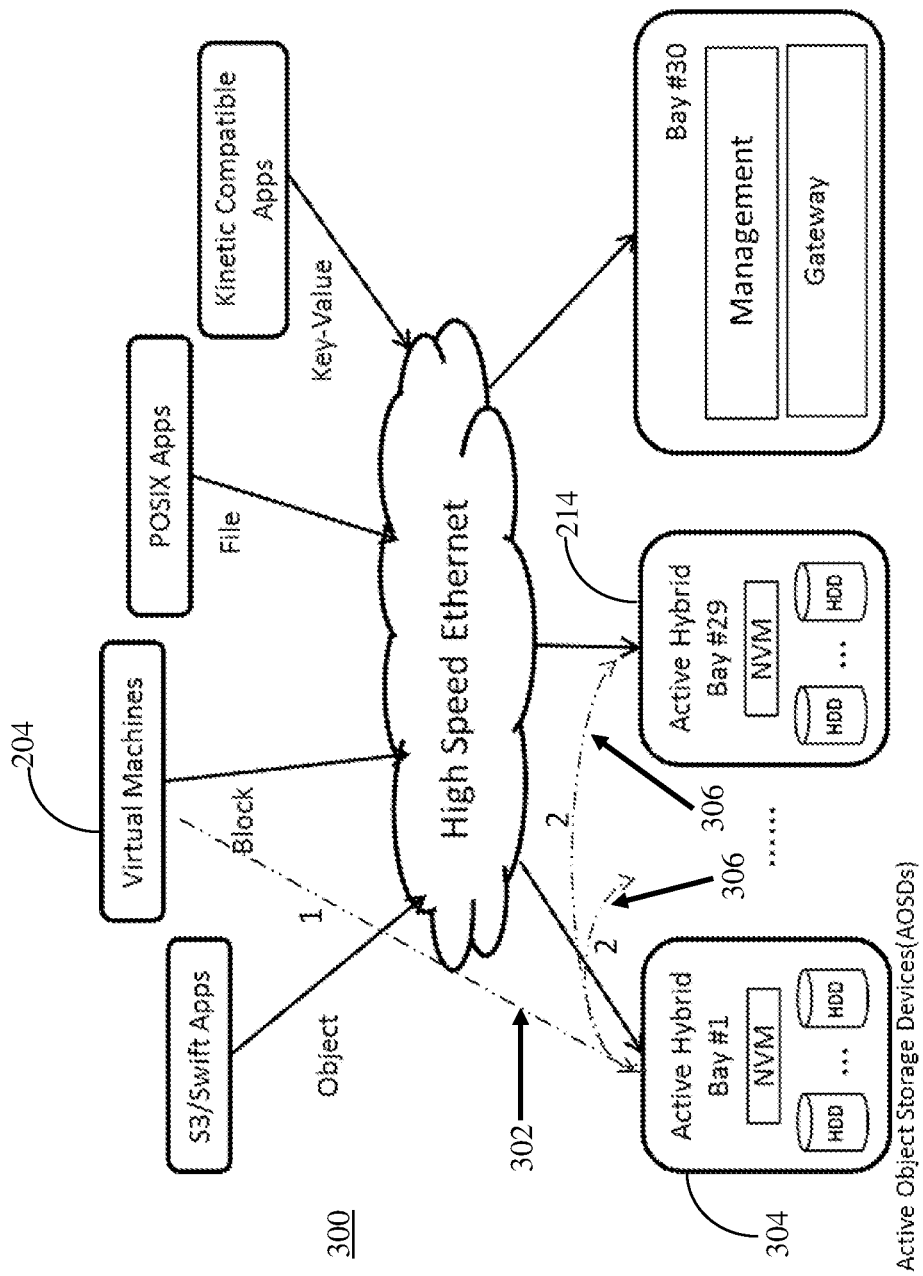
FIG. 3 illustrates a block diagram of the active storage array of FIG. 2 depicting data stripping and distribution implemented in the active controller boards (ACBs) in accordance with the present embodiment.
Figure 4:
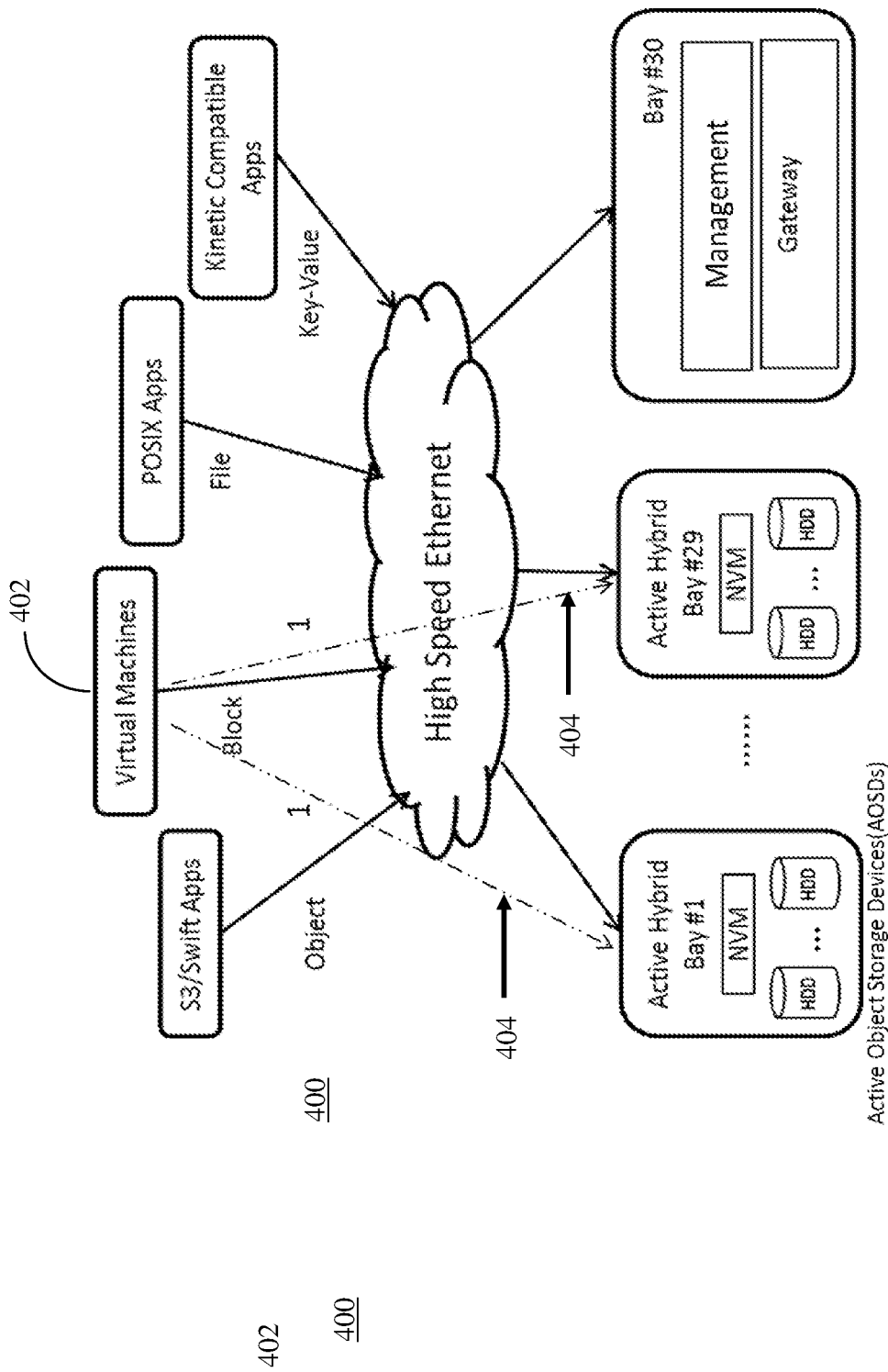
FIG. 4 illustrates a block diagram of the active storage array of FIG. 2 depicting data stripping and distribution implemented in the application servers in accordance with the present embodiment.

Referring to FIG. 3 and FIG. 4, the two erasure code implementations are illustrated and compared in how data can be accessed when data stripping and parity computation is implemented in the two different locations. FIG. 3 illustrates a block diagram 300 of the active storage array 202 depicting major steps when erasure code data stripping and distribution is implemented in an ACB 108 of an ASU 106 in accordance with the present embodiment. FIG. 4 illustrates a block diagram 400 of the active storage array 202 depicting main steps when erasure code data stripping and computation is implemented in the application servers 204, 206, 208, 210 in accordance with the present embodiment.

Referring to FIG. 3, when the ACB erasure code data stripping and distribution implementation accesses data, two main steps are involved. First, the application servers (e.g., the application server 204) access 302 a primary AOSD 304 of the erasure code group for both read and write requests. Then, to write data, the primary AOSD 304 performs data stripping and parity computation while also sending 306 data writing requests to corresponding AOSDs 214 in the group. To read data, the primary AOSD 304 first computes data locations of the data to be read, and then sends data read requests to corresponding AOSDs 214 in the group to retrieve them.

Referring to FIG. 4, in the application server erasure code data stripping and distribution implementation only one step is required. When reading data, an application server, such as a Virtual Machine (VM) 402 in a data center, computes locations of data to be read and then sends 404 read requests to corresponding AOSDs 214 at the same time. To write data, the application server 402 performs data stripping and computation and then sends 404 data write requests to corresponding AOSDs 214 at the same time.

Both approaches have their advantages and disadvantage and can be implemented separately or jointly.

An INT code is an erasure code designed for a system to enable the system to sustain multiple device failures at the same time. In accordance with the present embodiment, an INT code is implemented in the active storage system to provide high data reliability and availability. Other erasure codes, such as Reed Solomon codes, can be implemented in the active storage system in accordance with the present embodiment; however, as compared to corresponding Reed Solomon codes, an INT code can shorten reconstruction time by at least fifty percent.

Figure 5:
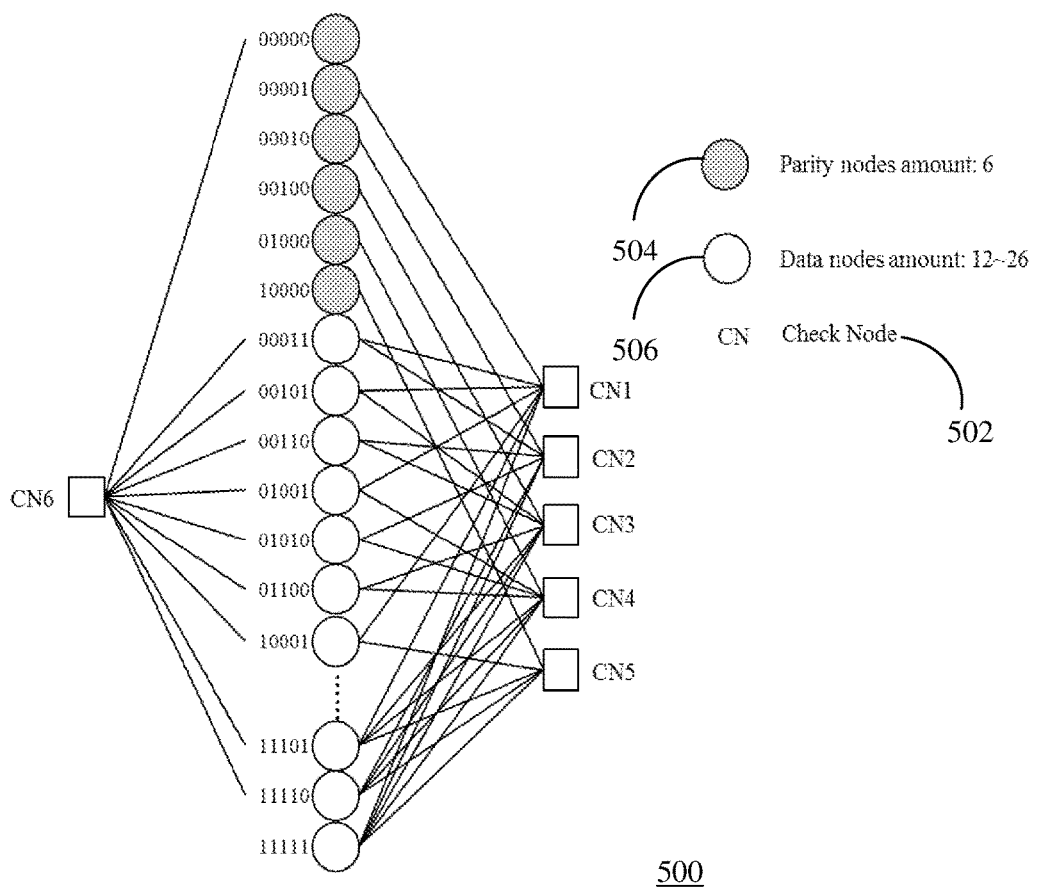
FIG. 5 illustrates a Tanner graph structure of a five-bit INT code in accordance with the present embodiment.

In accordance with the present embodiment, a method for data stripping and allocation when using an INT code is described. FIG. 5 illustrates a Tanner graph structure 500 of a five-bit INT code in accordance with the present embodiment which is designed for an active storage system to sustain up to three simultaneous failures. The maximum code group size for the five-bit INT code is thirty-two using six check nodes 502. Six devices out of the thirty-two devices are parity nodes 504 which store parity data and the remaining twenty-six devices out of the thirty-two devices are data nodes 506 which store data. Utilizing this system design, the active storage system can be protected from up to three simultaneous device failures.

Figure 6:
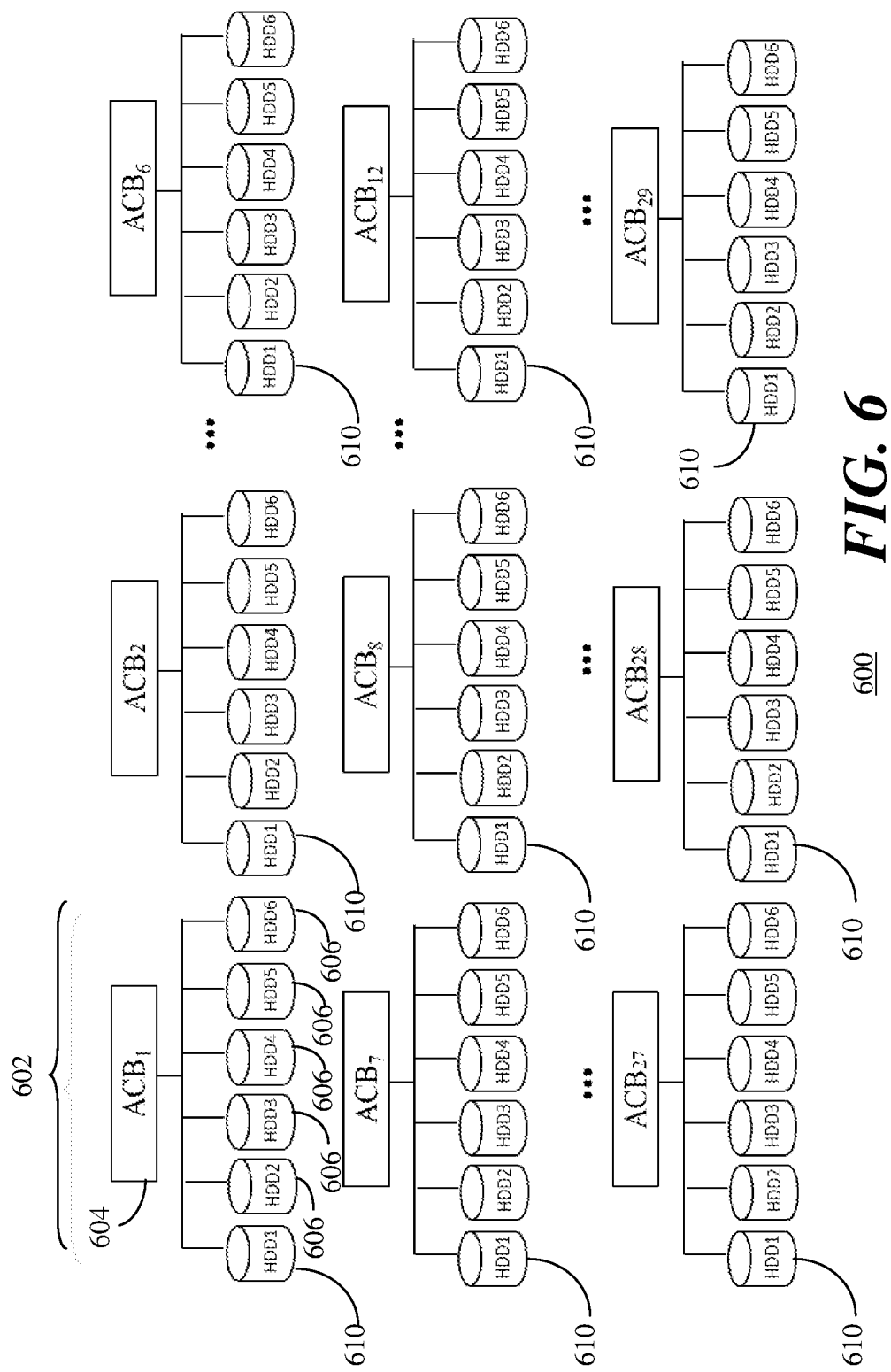
FIG. 6 illustrates a diagram of active storage units (ASUs) including ACBs and hard disk drives (HDDs) in an array of active storage devices in accordance with the present embodiment.

FIG. 6 illustrates a diagram 600 of twenty-nine active storage units (ASUs) 602 including ACBs 604 and hard disk drives (HDDs) 606 in an array of active storage devices within a storage enclosure (e.g. the chassis 102 (FIG. 1)) in accordance with the present embodiment. Each ASU 602 has one ACB 604 and six HDDs 606 coupled thereto and each HDD 606 is configured as an AOSD 214. Therefore, the maximum number of AOSDs 214 in one ASU 602 is six, the maximum number of ASUs 602 in a chassis is twenty-nine and the maximum number of AOSDs in one chassis is 174.

To implement the above-described five-bit INT code, the erasure code group size is selected as twenty-eight. This is compatible with the current chassis design which holds twenty-nine ASUs 602. Thus, in each erasure code group there are twenty-eight AOSDs 214, and out of the twenty-eight AOSDs 214, six of them store parity data and twenty-two of them store data.

Figure 7:
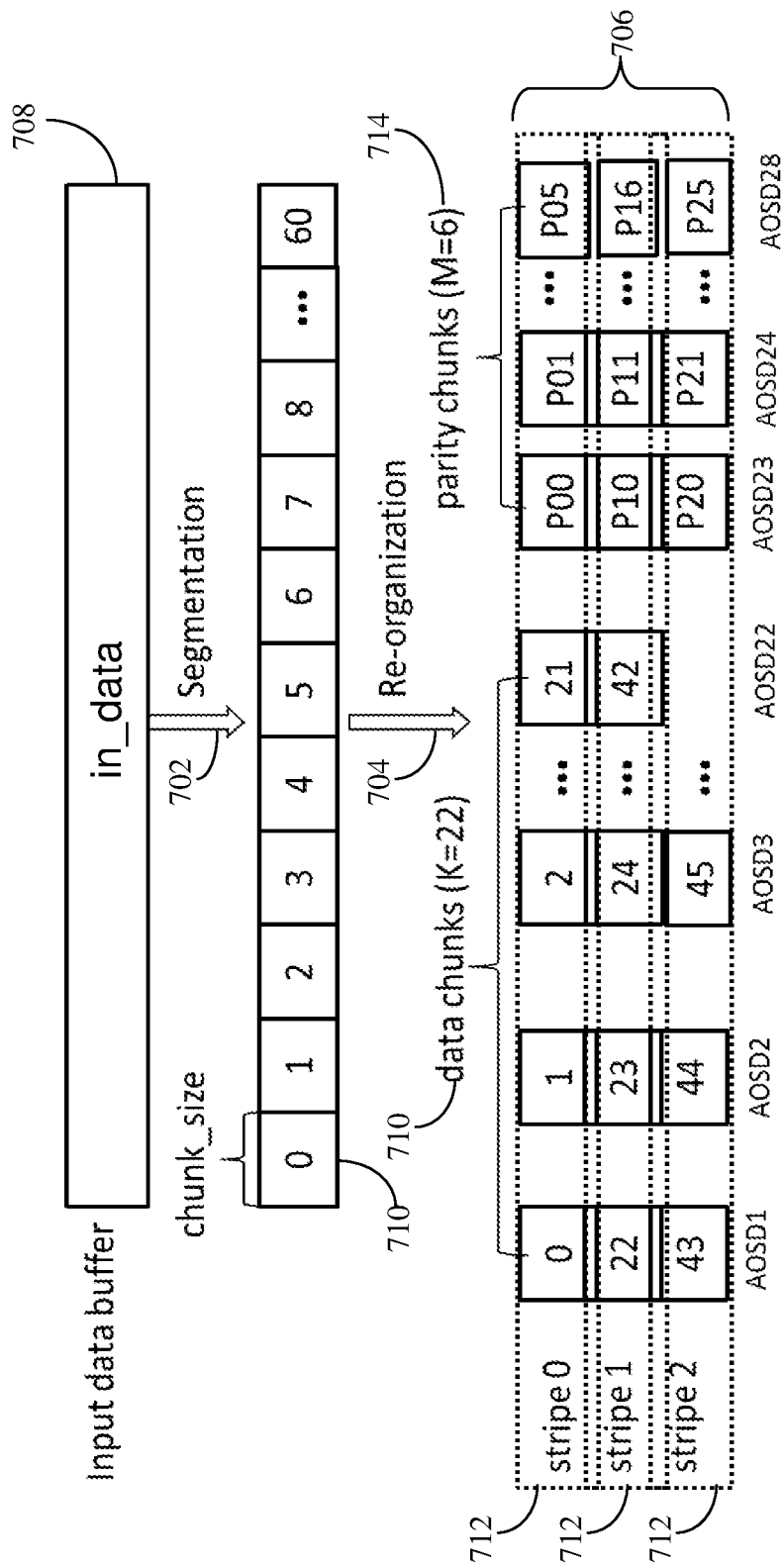
FIG. 7 illustrates a diagram of a data stripping and distribution process in an array of active storage devices in accordance with the present embodiment.

Referring to FIG. 7, a diagram 700 illustrates a data stripping and distribution process in an array of active storage devices in accordance with the present embodiment and depicts how to perform erasure code computation, data striping and distribution within the array of active storage devices. There are three major steps for data write: data segmentation 702, data reorganization 704, and erasure code computation and data distribution 706.

Data segmentation 702 divides incoming write data requests with a size of in_data (i.e., the data size to be written to storage) temporarily stored in an input data buffer 708 into multiple smaller but same sized data chunks 710. The data chunk size is configurable (e.g., the data chunk size can be as small as one kilobyte). In the diagram 700, the in_data has been segmented to sixty data chunks.

During data reorganization 704, the multiple segmented data chunks 710 are reorganized into stripes 712. The number of data chunks 710 for each stripe 712 is determined by the erasure code group size. In the diagram 700, each stripe 712 contains twenty-two data chunks 710 and six parity chunks 714. Thus, as can be seen in the diagram 700, there are three stripes 712 formed for the write request with a size of in_data.

In the erasure code computation and data distribution 706, the parity chunks 714 are computed for each stripe 712. In the diagram 700, each stripe 712 needs to compute six parity chunks 714, each with a size of chunk_size. The computation is based on the INT code encoding algorithm designed by the Tanner graph 500. All data chunks 710 and parity chunks 714 are distributed to corresponding AOSDs. As described above in reference to FIG. 6, in each erasure code group there are twenty-eight AOSDs 214, and out of the twenty-eight AOSDs 214 (i.e., AOSD 1 to AOSD 28), twenty-two of them (AOSD1 to AOSD22) store data and six of them (AOSD23 to AOSD 28) store parity data. Thus, referring back to the diagram 700, three data chunks (data chunks 0, 22, 43) will be written to AOSD1, data chunks 1, 23, 44 will be written to AOSD2, etc.

In this manner, AOSD1 to AOSD28 is a logical group containing twenty-eight AOSDs. Each logical device in the group maps to a corresponding AOSD in the system. In other words, to save the in_data, twenty-eight AOSDs have to be chosen from the 174 AOSDs in the system to form the logical group. In accordance with the present embodiment, the twenty-eight AOSDs can be selected (as described hereinafter) so that high data reliability can be achieved.

In an active drive system in accordance with the present embodiment, there are mainly two types of failures: one is a HDD failure and the other is an ASU failure. An ASU failure could be due to the failure of the ASU's ACB or the failure of the connected six HDDs. When a HDD fails, the data stored in the HDD will no longer be accessible. When one ASU fails, the data stored in the six HDDs of the ASU can no longer be accessed.

In accordance with the present embodiment, rules are applied to the active storage system to protect the system when sustaining a major failure. A major failure is dependent upon ratio of ACBs to HDDs. In the case where there are six HDDs to one ACB, a major failure is defined as any three simultaneous ASU failures, any three simultaneous HDD failures, any one ASU failure simultaneously with any two HDD failures, or any two ASU failures simultaneously with any one HDD failure. First, all the HDDs connected to one ACB should not be in the same erasure code group, they should participate in more than one group. For example, with twenty-nine ASUs and each ASU containing one ACB and six HDDs, the rule is that all six HDDs connected to one ACB inside one ASU have to participate in different code groups. Thus, the twenty-eight AOSDs have to come from twenty-eight different ASUs in the system (i.e., each ASU can only chose one HDD/AOSD to be in the code group). For example, referring to the diagram 600 in FIG. 6, one possible erasure code group can be formed by selecting all HDD1s 610 connected to each of the twenty-eight ACBs 604 from ACB 1 to ACB 28.

Figure 8:
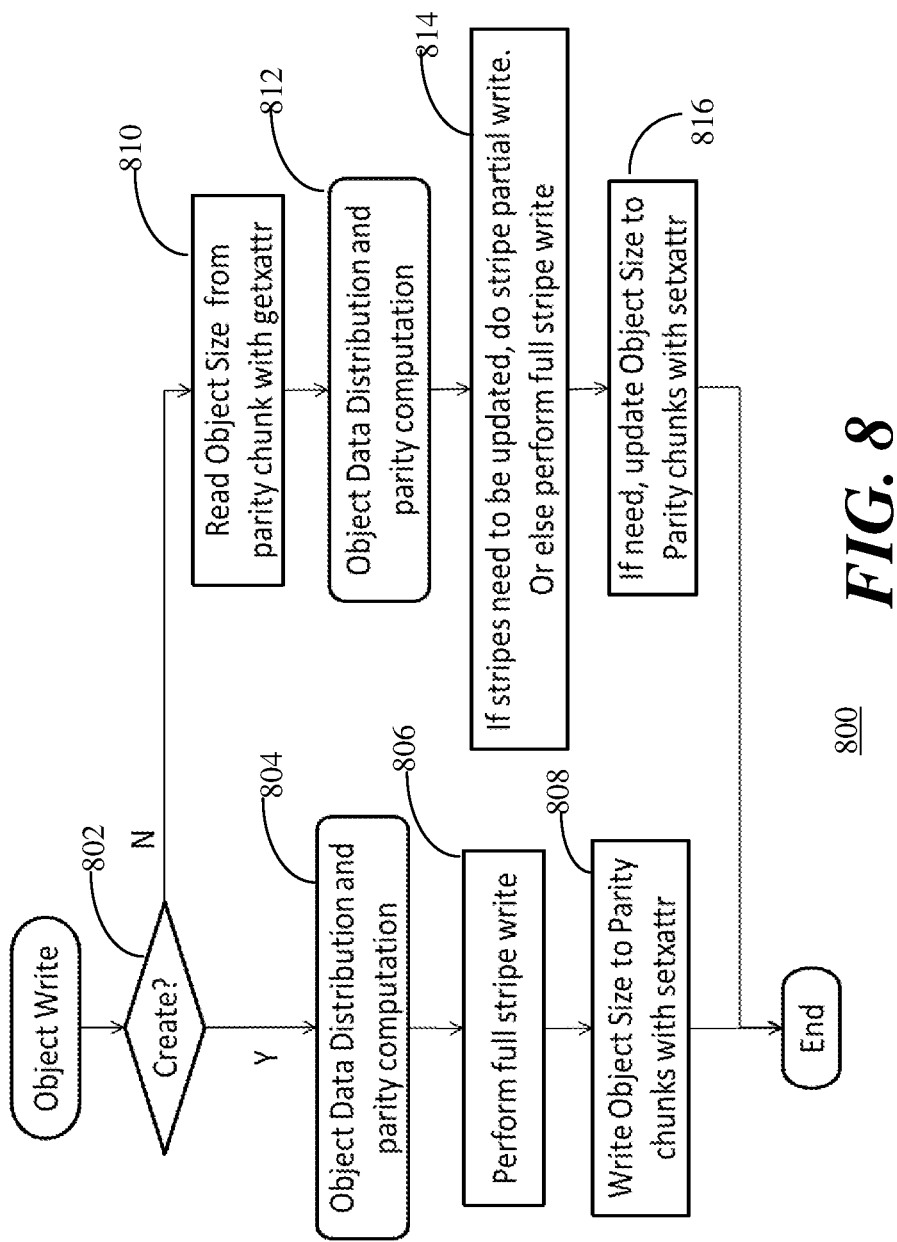
FIG. 8 illustrates a flowchart for a data write process in an active storage array in accordance with the present embodiment.

Referring to FIG. 8, a flowchart 800 depicts a data write process in an active storage array in accordance with the present embodiment. For the case of implementing data stripping and computation in the ACBs of the system, the application server 204, 206, 208, 210 which needs to access data first has to compute or select a group of AOSDs 214, identify one primary AOSD in the group, and then connect to the primary AOSD to write data.

The primary AOSD checks 802 whether the data write is for a new data write (i.e., the stored data needs to be created) or not. If new data is to be written 802, data segmentation, reorganization, erasure code computation and data distribution as illustrated in the diagram 700 (FIG. 7) are performed 804. The code group with twenty-eight AOSDs also needs to be selected based in accordance with the rule mentioned above. Once it is done, the primary AOSD sends data write to corresponding AOSDs simultaneously to perform full stripe write 806. Once the write 806 is completed, the primary AOSD keeps object size information; it can also send object size information 808 to the AOSDs which hold parity of the data to keep additional copies. This step 808 is performed by adding one attribute, an object size, to the existing data structure of xattr through a setxattr function in the existing system.

When the data being written is not new data 802, but data for update or modification, the object size can be read by the primary AOSD from the corresponding parity chunk 810 and data segmentation, reorganization, erasure code computation and data distribution of the object data is performed 812. If the primary AOSD already has the corresponding object size information, the primary AOSD can skip the step of reading the object size. With object size 810, and based on the data distribution and erasure code computation 812, the stripe number and AOSD can be identified. If one whole stripe needs to be updated, the application server will perform full write 814. When only a part of the stripe needs to be updated, the primary AOSD can perform partial write 814. For a full write, the primary AOSD send data and parities to all the corresponding AOSDs in the group to write 816. For partial writing, the procedure is depicted in FIG. 9.

For the case of implementing data stripping and computation in an application server, the application server 204, 206, 208, 210 which needs to perform data stripping and computation performs the object write of the flowchart 800. Thus, the application server checks whether data read is for new data write or not 802. If it is for a new data write 802, data segmentation, reorganization, erasure code computation and data distribution are performed 804 and the code group with twenty-eight AOSDs is selected based on the rule described above. Then, the application server sends data write instructions to corresponding AOSDs simultaneously to perform full write 806. Once the write is completed 806, the application server sends object size information to the AOSDs which holds parity of the data for storage therein 808 by adding one attribute, object size, to the existing data structure of xattr through setxattr function in the existing system.

When the application server is performing an object write for data which is not new data but data for data update or modification 802, the application server first sends a request 810 to read the object size through getxattr from the AOSDs holding the parity. With the object size and based on the data distribution and erasure code computation 812, the stripe number and AOSDs can be identified. When one whole stripe need to be updated, the application server performs full write 814. When only a part of the stripe needs to be updated, the application server performs 814 a partial write (as described in FIG. 9). For full write 814, the application server sends data and parities to all the corresponding AOSDs in the group to write 816.

Figure 9:
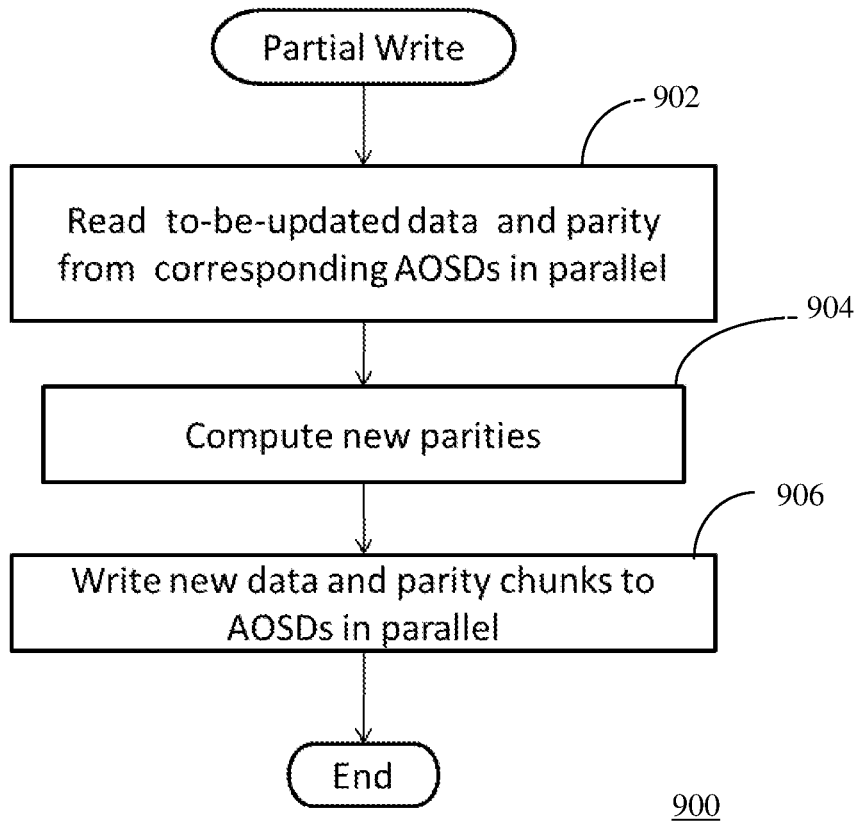
FIG. 9 illustrates a flowchart for a partial data write and data update process in an active storage array in accordance with the present embodiment.

FIG. 9 illustrates a flowchart 900 for a partial data write and data update process in an active storage array in accordance with the present embodiment. When implementing data stripping and computation in ACBs of the system, the primary AOSD sends read requests to read out the data-to-be-updated chunks and corresponding parity chunks 902. The new parity data is then computed 904 based on the data and parity read out and also on the new data to be written. Once the new parities are computed 904, the primary AOSD will send 906 the new data and parity to the respectively AOSDs simultaneously.

When implementing data stripping and computation in an application server, the applicate server sends read requests to read out the data-to-be-updated chunks and corresponding parity chunks 902. The new parity data is then computed 904 based on the data and parity read out and also on the new data to be written. Once the application server computes the new parity data 904, the application server will send the new data and the new parity data to the respectively AOSDs simultaneously 906.

Figure 10:
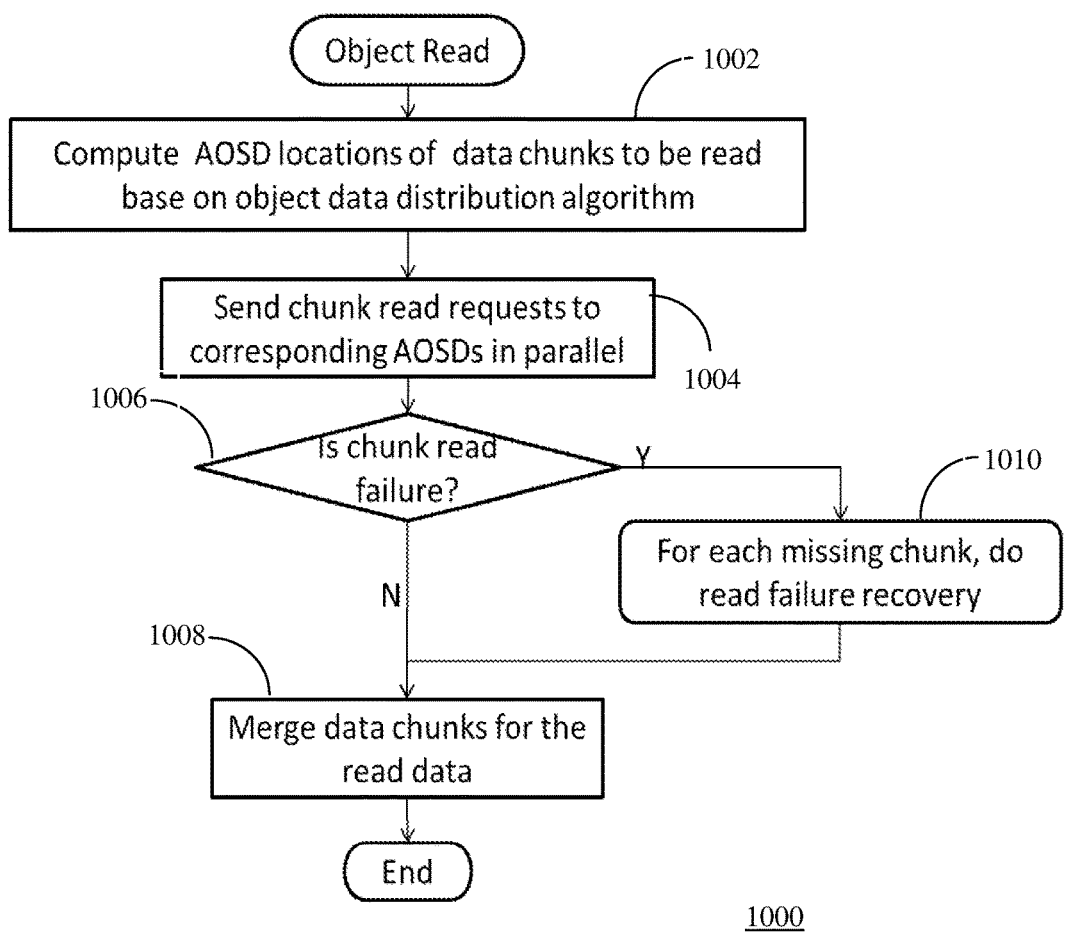
FIG. 10 illustrates a flowchart for a data read process in an active storage array in accordance with the present embodiment.

Referring to FIG. 10, a flowchart 1000 for a data read process in an active storage array in accordance with the present embodiment is depicted. When implementing data stripping and computation in an ACBs of the system, if the primary AOSD has the information of the size of the object to be read, it does not need to read it from other AOSDs. Otherwise, the primary AOSD computes 1002 locations of the AOSDs which store the data chunks and sends 1004 chunk read requests to the AOSDs to read the data chunks out. When there are multiple chunks to be read out, the primary AOSD sends out the read requests 1004 to all the corresponding OSDs simultaneously. If the read is done successfully 1006, the primary AOSD will merge all the data chunks together 1008 before sending them back to the requestors. If the read is not done successfully 1006, the primary AOSD will initialize read failure recovery processes for each missing chunk 1010 as described in FIG. 11.

When implementing data stripping and computation in an application server, to perform data read, the application server first has to read out the size of the data from the AOSDs which store the information, that is the AOSDs keeping parity chunks, through calling a getxattr function. Once the function is completed, the application server can identify locations of AOSDs storing the data chunks 1002 and then issue read requests 1004 to read the data chunks out. When there are multiple chunks to be read out, the application server sends out the read requests 1004 to all the corresponding OSDs simultaneously. If the data chunks are successfully read out 1006, the application server can merge all the data chunks together 1008 before sending them back to the requestors. If the read is not done successfully 1006, the application server will initialize a read failure recovery process 1010 for each missing chunk in accordance with FIG. 11.

Figure 11:
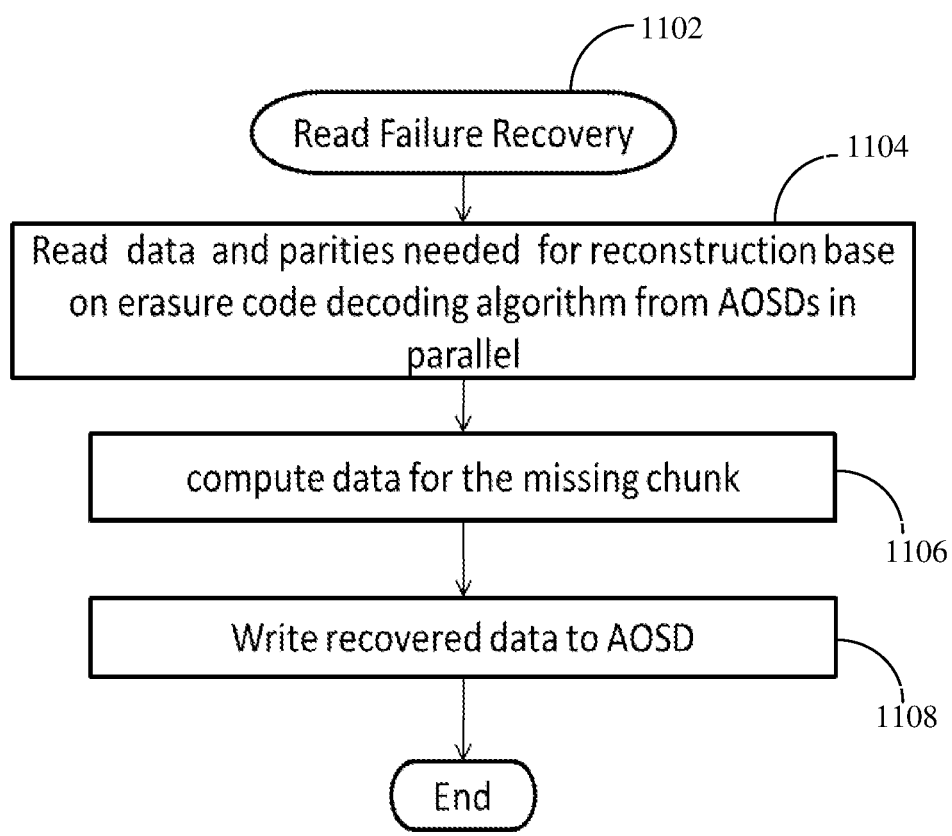
FIG. 11 illustrates a flowchart for a read failure recovery process in an active storage array in accordance with the present embodiment.

FIG. 11 illustrates a flowchart 1100 for a read failure recovery process in an active storage array in accordance with the present embodiment. When implementing data stripping and computation in an ACB of the system, when a read failure is encountered, the primary AOSD will initialize a read failure recovery process 1102. Based on the erasure code and data distribution algorithms, the primary AOSD sends out read requests to the corresponding AOSDs to read out data chunks need to be used for the recovery 1104. Once the data is received, the primary AOSD will compute and recover the failed data 1106 and send it back to the requester. In the meantime, the primary AOSD can also write the data to the AOSD whose read was failed initially or any other AOSD appointed 1108.

When implementing data stripping and computation in an application server, once the application server encounters a read failure, it will initialize the read failure recovery process 1102. Based on the erasure code and data distribution algorithm, the application server sends out read requests to the corresponding AOSDs to read out data chunks required for the recovery 1104. Once the data is received 1104, the application server will compute and recover the failed data 1106 and send it back to the requester. Also, the application server writes the data to the AOSD whose read failed initially or any other AOSD appointed 1108.

Figure 12:
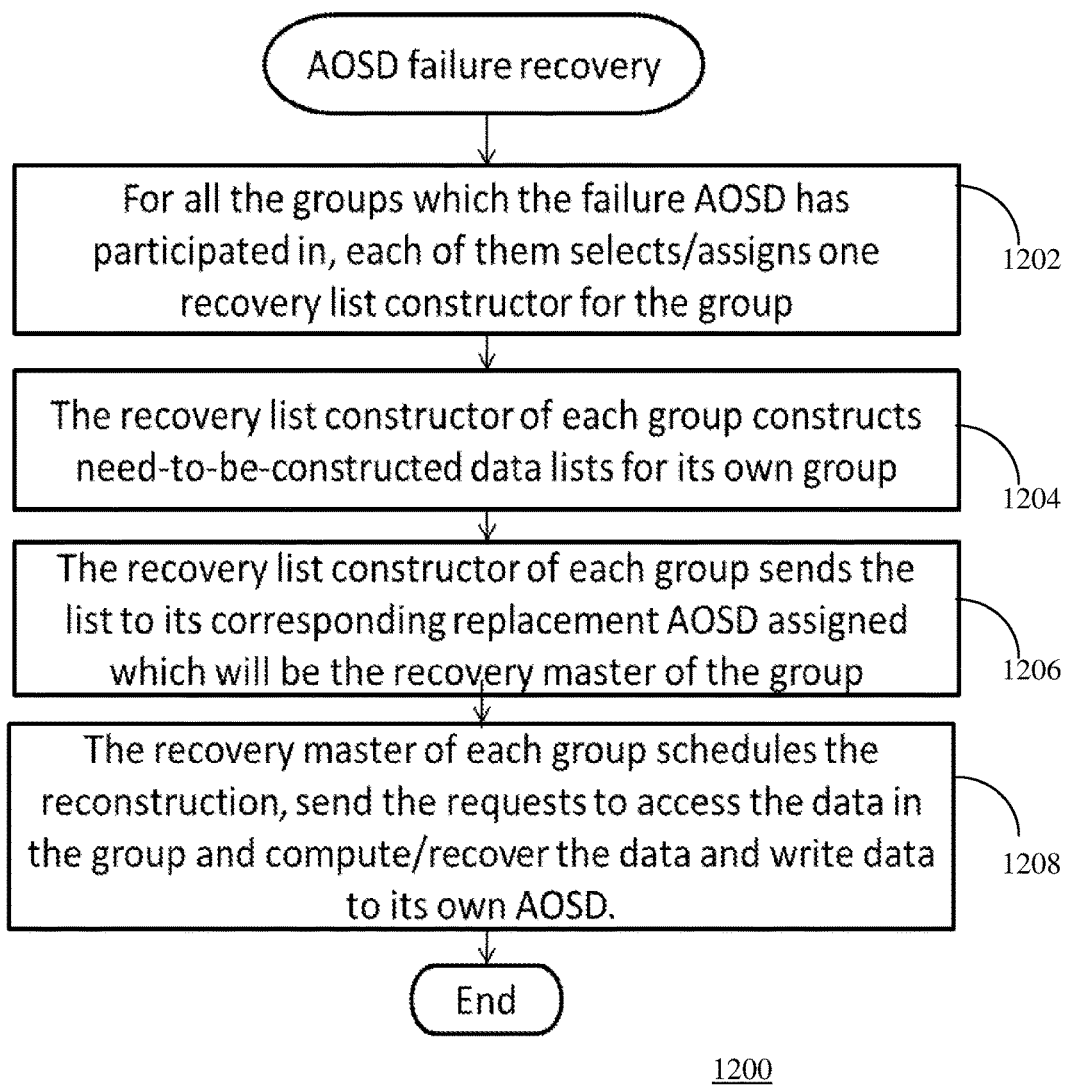
FIG. 12 illustrates a flowchart for a device failure recovery process in an active storage array in accordance with the present embodiment.

FIG. 12 illustrates a flowchart 1200 for an AOSD failure recovery process in an active storage array in accordance with the present embodiment. When implementing data stripping and computation in ACBs of the system, the AOSD failure can be identified by management in the system and management can initialize the recovery process. The primary AOSD is selected as a recovery list constructor 1202 for its group and is responsible to build the list of the objects of the group needed to be reconstructed 1204 if the primary AOSD does not have the list. This can be done by scanning through all the available AOSDs in the group. Once the list is completed 1204, the primary AOSD will send the list to the corresponding replacement AOSD assigned 1206. The replacement AOSD assigned will be the recovery master responsible for reconstruction scheduling, computation and data writing 1208.

When implementing data stripping and computation in an application server, since one AOSD can participate in multiple erasure code groups and there is no primary AOSD when the application server is implementing the data stripping and computation, a recovery list constructor is selected/assigned for each group 1202. Each recovery list constructor is responsible for constructing the object/data list that need to be reconstructed for its own group 1204. Once the list is done 1204, the recovery list constructors will send the list to the corresponding replacement AOSD assigned 1206 who will be a recovery master responsible for reconstruction scheduling, computation and data writing 1208.

When the failure of ASUs is a multiple AOSD failure, the AOSD reconstruction process 1200 follows the single AOSD failure recovery process to reconstruct each AOSD one by one.

Figure 13:
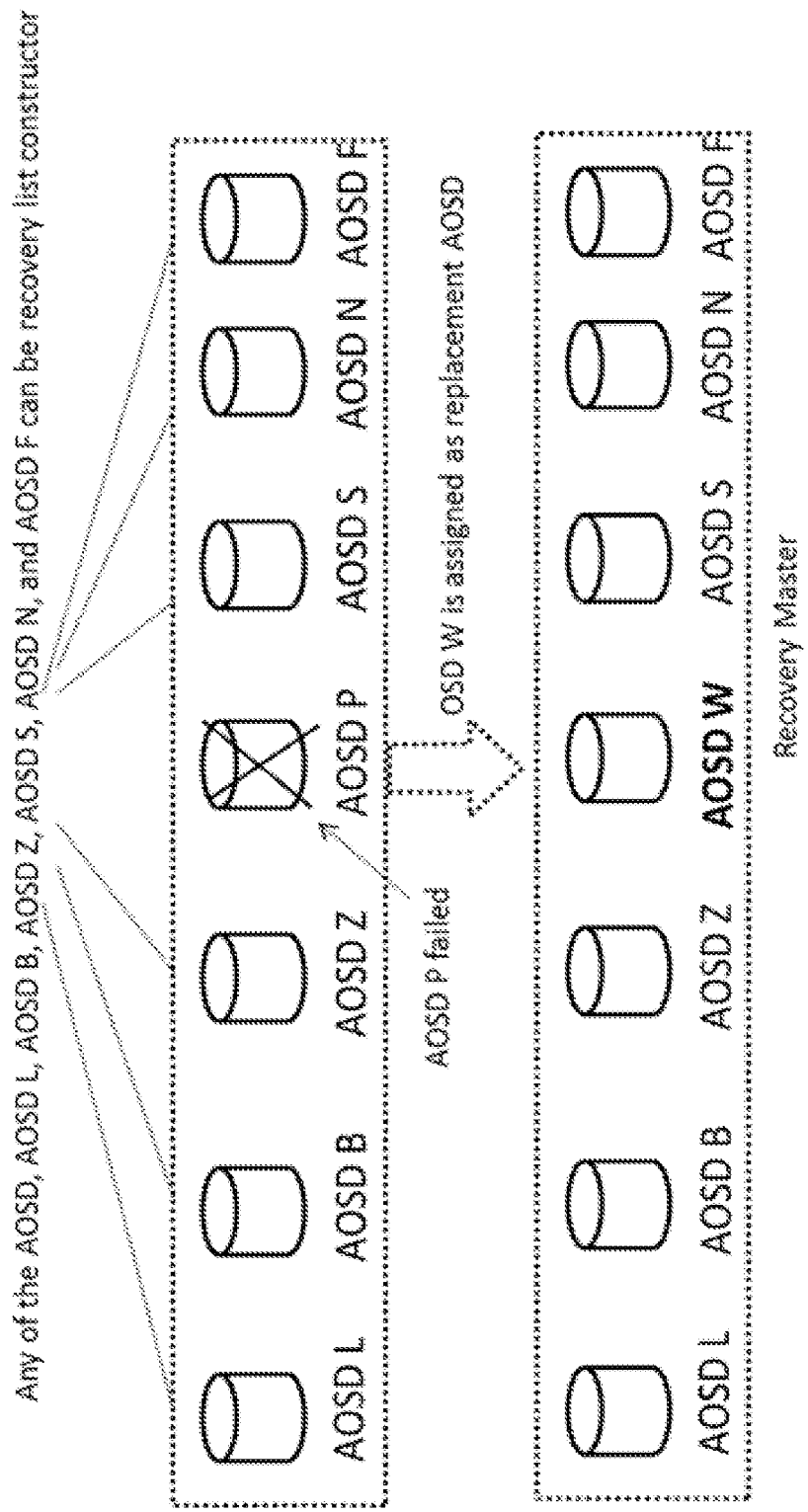
FIG. 13 illustrates a diagram depicting a recovery list construction and recovery master in an active storage array in accordance with the present embodiment.

FIG. 13 illustrates a diagram 1300 depicting a recovery list construction and recovery master in a code group in an active storage array in accordance with the present embodiment. When implementing data stripping and computation in the application server, there is no primary AOSD in the group to build the recovery list for reconstruction. There are seven AOSDs in the group and they are AOSD L, AOSD B, AOSD Z, AOSD P, AOSD S, AOSD N, and AOSD F. Once AOSD P fails, any available AOSD can be a recovery list constructor which will construct the list of data need to be reconstructed by scanning through all the data in the group. When implementing data stripping and computation in the ACBs of the system, the primary AOSD of this group will be the recovery list constructor responsible for constructing the list.

Once the list is constructed, the recovery list constructor will send the list to AOSD W which is the replacement AOSD assigned by system management. AOSD W will be the recovery master of this group. Based on the list received, AOSD W will be responsible to schedule the reconstruction process, compute data and write data to its own storage. In this manner, the data that needs to be transmitted over a network during the reconstruction is reduced providing both time and work.

Thus, it can be seen that the present embodiment can provide a method and device for data stripping, parity computation, data allocation and data reconstruction within a storage system with an array of active storage devices which provides improved data access performance and shortened read failure reconstruction time. The present method is applicable to erasure code data stripping and distribution is implemented in an ACB of an ASU as well as erasure code data stripping and computation is implemented in the application servers.

While exemplary embodiments have been presented in the foregoing detailed description of the invention, it should be appreciated that a vast number of variations exist. It should further be appreciated that the exemplary embodiments are only examples, and are not intended to limit the scope, applicability, operation, or configuration of the invention in any way. Rather, the foregoing detailed description will provide those skilled in the art with a convenient road map for implementing an exemplary embodiment of the invention, it being understood that various changes may be made in the function and arrangement of elements and method of operation described in an exemplary embodiment without departing from the scope of the invention as set forth in the appended claims.

What is claimed is:

1. A method for data stripping, allocation and reconstruction in an active drive storage system including a plurality of active object storage devices, each of the plurality of active object storage devices including one or more storage devices and a controller, the method comprising:
   receiving data at an identified one of the plurality of active object storage devices for storage in one or more of the plurality of active object storage devices; the controller of the identified one of the plurality of active object storage devices segmenting the received data into a plurality of data chunks;
   the controller of the identified one of the plurality of active object storage devices generating one or more parity chunks in response to the plurality of data chunks;
   the controller of the identified one of the plurality of active object storage devices reorganizing the plurality of data chunks and the one or more parity chunks in response to a number of the plurality of data chunks and a number of the one or more of the plurality of active object storage devices into which the received data is to be stored; and
   the controller of the identified one of the plurality of active object storage devices storing the plurality of data chunks and the one or more parity chunks into the one or more of the plurality of active object storage devices, wherein the step of storing the plurality of data chunks and the one or more parity chunks into the one or more of the plurality of active object storage devices comprises writing an object size of the received data to the one or more parity chunks.

2. The method in accordance with claim 1 wherein the step of reorganizing the plurality of data chunks and the one or more parity chunks comprises reorganizing the plurality of data chunks and the one or more parity chunks into one or more stripes of data/parity chunks.

3. The method in accordance with claim 2 wherein the step of storing the plurality of data chunks and the one or more parity chunks into the one or more of the plurality of active object storage devices comprises performing a full strip write of each of the one or more stripes of data/parity chunks into the one or more of the plurality of active object storage devices.

4. The method in accordance with claim 2 wherein the step of receiving the data comprises:
   receiving the data at the identified one of the plurality of active object storage devices; and
   determining whether the received data is new data or update data, and wherein the step of storing the plurality of data chunks and the one or more parity chunks into the one or more of the plurality of active object storage devices comprises:
      performing a full strip write of each of the one or more stripes of data/parity chunks into the one or more of the plurality of active object storage devices if the received data is new data;
      if the received data is update data, determining for each stripe if the full stripe needs to be updated or if a portion of the stripe needs to be updated and performing a full strip write for each full stripe that needs to be updated and performing a partial write for each stripe that requires only a portion to be updated.

5. The method in accordance with claim 4 wherein the step of performing a partial write comprises:
   reading to-be-updated data chunks and corresponding parity chunks for each stripe in parallel from the active object storage devices in which the data/parity chunks for that stripe are stored;
   updating the to-be-updated data chunks in response to the received data;
   recomputing the parity chunks in response to the updated data chunks; and writing the updated data chunks and the corresponding recomputed parity chunks for each stripe in parallel to the active object storage devices in which the data/parity chunks for that stripe were stored.

6. The method in accordance with claim 5 wherein the step of reading the to-be-updated data chunks and the corresponding parity chunks for each stripe in parallel comprises:
   computing active object storage device locations for each to-be-updated data chunk and each corresponding parity chunk in the stripe;
   sending chunk read requests to all of the active object storage device locations in the stripe in parallel; and
   merging data chunks and parity chunks received in response to the chunk read requests to derive an updated stripe of the to-be-updated data chunks and the corresponding parity chunks that are read.

7. The method in accordance with claim 6 wherein the computing active object storage device locations step comprises computing active object storage device locations in response to an object data distribution algorithm.

8. The method in accordance with claim 6 wherein the step of merging data chunks and parity chunks comprises:
   determining whether a chunk read failure has occurred in response to failure to receive a response to one or more of the chunk read requests for the stripe;
   identifying missing chunks in response to the to-be-updated data chunks and corresponding parity chunks that have been read;
   computing data for the missing chunks in response to the to-be-updated data chunks and corresponding parity chunks that have been read; and
   merging data chunks and parity chunks received in response to the chunk read requests and the data for the missing chunks to derive the stripe of the to-be-updated data chunks and the corresponding parity chunks.

9. A method for data stripping, allocation and reconstruction in an active drive storage system including a plurality of active object storage devices, each of the plurality of active object storage devices coupled to one or more application servers, the method comprising:
   receiving data for storage in one or more of the plurality of active object storage devices;
   one of the one or more application servers segmenting the received data into a plurality of data chunks;
   the one of the one or more application servers generating one or more parity chunks in response to the plurality of data chunks;
   the one of the one or more application servers reorganizing the plurality of data chunks and the one or more parity chunks in response to a number of the plurality of data chunks and a number of the one or more of the plurality of active object storage devices into which the received data is to be stored; and the one of the one or more application servers storing the plurality of data chunks and the one or more parity chunks into the one or more of the plurality of active object storage devices, wherein the step of storing the plurality of data chunks and the one or more parity chunks into the one or more of the plurality of active object storage devices comprises writing an object size of the received data to the one or more parity chunks.

10. The method in accordance claim 9 wherein the step of reorganizing the plurality of data chunks and the one or more parity chunks comprises reorganizing the plurality of data chunks and the one or more parity chunks into one or more stripes of data/parity chunks.

11. The method in accordance with claim 10 wherein the step of storing the plurality of data chunks and the one or more parity chunks into the one or more of the plurality of active object storage devices comprises performing a full strip write of each of the one or more stripes of data/parity chunks into the one or more of the plurality of active object storage devices.

12. The method in accordance with claim 10 wherein the step of receiving the data comprises:
receiving the data at the identified one of the plurality of active object storage devices; and
determining whether the received data is new data or update data, and wherein the step of storing the plurality of data chunks and the one or more parity chunks into the one or more of the plurality of active object storage devices comprises:
performing a full strip write of each of the one or more stripes of data/parity chunks into the one or more of the plurality of active object storage devices if the received data is new data;
if the received data is update data, determining for each stripe if the full stripe needs to be updated or if a portion of the stripe needs to be updated and performing a full strip write for each full stripe that needs to be updated and performing a partial write for each stripe that requires only a portion to be updated.

13. The method in accordance with claim 12 wherein the step of performing a partial write comprises:
reading to-be-updated data chunks and corresponding parity chunks for each stripe in parallel from the active object storage devices in which the data/parity chunks for that stripe are stored;
updating the to-be-updated data chunks in response to the received data;
recomputing the parity chunks in response to the updated data chunks; and
writing the updated data chunks and the corresponding recomputed parity chunks for each stripe in parallel to the active object storage devices in which the data/parity chunks for that stripe were stored.

14. The method in accordance with claim 13 wherein the step of reading the to-be-updated data chunks and the corresponding parity chunks for each stripe in parallel comprises:
computing active object storage device locations for each to-be-updated data chunk and each corresponding parity chunk in the stripe;
sending chunk read requests to all of the active object storage device locations in the stripe in parallel; and
merging data chunks and parity chunks received in response to the chunk read requests to derive an updated stripe of the to-be-updated data chunks and the corresponding parity chunks that are read.

15. The method in accordance with claim 14 wherein the computing active object storage device locations step comprises computing active object storage device locations in response to an object data distribution algorithm.

16. The method in accordance with claim 14 wherein the step of merging data chunks and parity chunks comprises:
determining whether a chunk read failure has occurred in response to failure to receive a response to one or more of the chunk read requests for the stripe;
identifying missing chunks in response to the to-be-updated data chunks and corresponding parity chunks that have been read;
computing data for the missing chunks in response to the to-be-updated data chunks and corresponding parity chunks that have been read; and
merging data chunks and parity chunks received in response to the chunk read requests and the data for the missing chunks to derive the stripe of the to-be-updated data chunks and the corresponding parity chunks.

17. A method for failure recovery from failure of an active object storage device in an active drive storage system including a plurality of active object storage devices, each of the plurality of active object storage devices belonging to one of a plurality of groups and each of the plurality of active object storage devices including one or more storage devices and a controller, the method comprising:
selecting a recovery list constructor for each one of the plurality of groups that a failed active object storage device has participated in;
each recovery list constructor constructing a need-to-be-constructed data list for its group;
each recovery list constructor sending the need-to-be-constructed data list for its group to a replacement active object storage device assigned as a recovery master for the group;
each recovery master scheduling the reconstruction for the group which includes one or more of sending requests to access data and corresponding parity data, computing recovered data in response to the accessed data and corresponding parity data, and writing the recovered data to the recovery master; and
thereafter the recovery master acting as the replacement active object storage device.

* * * * *